F. G. JOHNSON.
Velocipede Ice-Boat.

No. 34,369.

Patented Feb. 11, 1862.

Witnesses:

Inventor:
Frank G. Johnson

UNITED STATES PATENT OFFICE.

FRANK G. JOHNSON, OF BROOKLYN, NEW YORK.

IMPROVEMENT IN VELOCIPEDE ICE-BOATS.

Specification forming part of Letters Patent No. 34,369, dated February 11, 1862.

*To all whom it may concern:*

Be it known that I, FRANK G. JOHNSON, of the city of Brooklyn, in the county of Kings and State of New York, have invented a new Velocipede Ice-Boat; and I do hereby declare that the following is a full, clear, and exact description of the construction and operation of the same, reference being had to the accompanying drawings, making a part of this specification, in which—

Figure 1:
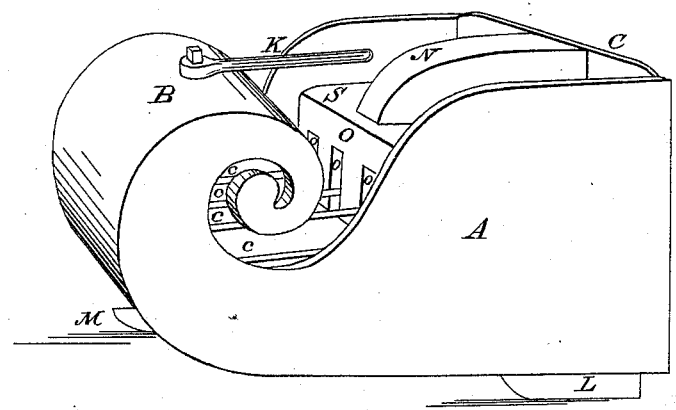
Figure 2:
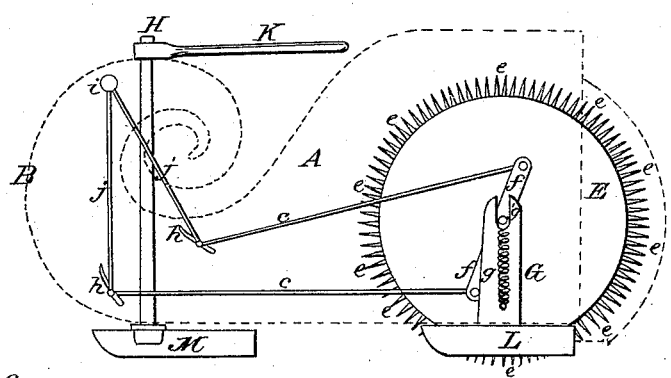
Figure 3:
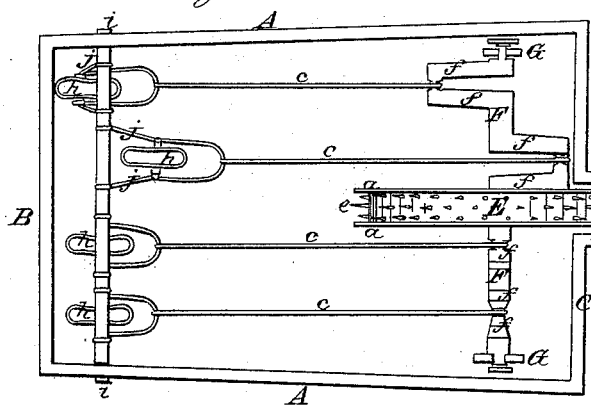
Figure 4:
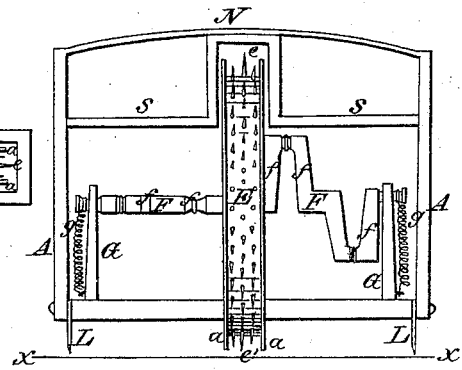

Figure 1 is a perspective view; Fig. 2, a longitudinal elevation; Fig. 3, a transverse section; Fig. 4, a transverse elevation.

Like letters refer to like parts.

The object of my invention is to provide a vehicle, which, as implied by the name, can be propelled on ice by foot or hand power.

The construction and operation of my invention are briefly described thus:

I construct a body of a vehicle, of size and shape to seat one or two persons, and place it on three runners, two of which are fastened behind, (one at each corner,) the other in the center, forward, and centered on a pivot in such a manner as to be controlled by a handle or rudder for the purpose of steering the vehicle. Under the seat is placed a shaft, (with suitable elbows or cranks,) on which is placed a spurred wheel, passing down through the floor and coming in contact with the ice, and which, being revolved by means of treadles, causes the vehicle to slide over the ice on the runners.

A more minute description is as follows: A B C represent the body of the velocipede; S, the seat; E, the spurred wheel; $e\,e\,e$, the spurs or points; N, the cover or case of the wheel; L L, the two hind runners, which are rigidly fastened to the body; M, the forward or steering runner, fastened to the bottom of and governed by the pivoting post H; K, the handle or rudder, by which, through the medium of the pivot-post H, the runner M is controlled for the purpose of causing the velocipede to move in any desired direction; F F, the shaft; $f\,f\,f\,f$, the elbows or cranks; $c\,c\,c\,c$, the connecting-rods that join the cranks to the treadles $h\,h\,h\,h$; $i\,i$, a suspension cross-bar to support the treadles; $j\,j\,j\,j$, suspension-rods to connect the treadles to the cross-bar; $o\,o\,o\,o$, openings in the front of the seat, through which the connecting-rods pass; G G, the stanchions on which the bearings are made for the shaft. The shaft works in boxes cut away at the top and bottom, as seen in Fig. 2, $g'$, so that the shaft and wheel are free to move up and down.

$g\,g$ are spiral springs, one end of which is fastened to the extremities of the shaft and the other to the stanchions to hold the wheel down on the ice.

The object of these open boxes and springs is to produce elastic bearings for the shaft in order that the weight of the velocipede (and its load) may principally fall upon the runners, and to allow only sufficient weight to be borne by the wheel to drive the spurs far enough into the ice to obtain the necessary resistance to move the velocipede. This elasticity of the bearings also allows the wheel to yield to any roughness or inequalities of the surface of the ice, so that the runners may be constantly in contact with and free to slide on the ice.

It will be seen by Figs. 2 and 4 that the point or spur $e'$ is in contact with the ice X X, Fig. 4, while the runners L L are suspended a little above the ice. Now, by allowing the weight of the velocipede and its load to be applied, the wheel will yield and rise by the elasticity of the springs, and the runners L L will take most of the weight and come in contact with the ice.

To prevent all jarring effect of the wheel that might be caused by its revolving on the spurs, as also to render it possible to use long points or spurs, so that they will not clog up with ice and snow, and at the same time to prevent the spurs from puncturing the ice too far and so impairing it for skating purposes, I fasten onto the sides of the wheel disks $a\,a\,a\,a$, projecting them far enough beyond the periphery to bear some of the pressure of the wheel and take part of the force of the springs $g\,g$, thus preventing the points from entering the ice beyond a given depth and causing continuous surfaces—viz., the periphery of the disks to be constantly in contact with the ice, which gives the wheel a very smooth and steady action, and prevents all the jar that might be caused by the wheel rolling on the spurs or points. I place the center—rather vertical diameter—of the wheel transversely in a line with and midway between the two hind runners, by means of which the greatest freedom of motion is secured to allow the velocipede to be governed and guided by the forward runner. The velocipede can thus be turned so short about as to cause either of the hind runners to serve as the center of motion, about or around which the vehicle can be turned by working the treadles.

From the foregoing description the method of operating my invention is too apparent to need further explanation. It is only necessary that the treadle be operated by the passenger or passengers, so as to revolve the spurred wheel, which gives sufficient resistance on the ice to drive the velocipede at any desired speed, and by the handle or rudder K it can be guided in any desired direction.

What I claim as my invention, and desire to secure by Letters Patent of the United States, is—

1. The combination of the runners L L M and the spurred wheel E, attached to and combined with a suitable body to be used as an ice-velocipede to be propelled by the feet or hands, substantially in the manner set forth.

2. The springs $g\ g$ or their equivalents, in combination with the shaft F F and spurred wheel E, substantially in the manner and for the purposes described.

3. The disks $a\ a\ a\ a$, combined with the periphery of the wheel E, and the spurs $e\ e$, substantially in the manner and for the purposes set forth.

4. The peculiar arrangement of the suspension-rods $j\ j\ j\ j$ and the connecting-rods $c\ c\ c\ c$ with the treadles $h\ h\ h\ h$, by which a person is enabled to sit on the seat S and exert great force upon the wheel E, for the purposes described.

FRANK G. JOHNSON.

Witnesses:
S. T. CANNON,
M. A. JOHNSON.